(Model.)
T. F. DEAN.
STEAM COOKER.
No. 246,472. Patented Aug. 30, 1881.
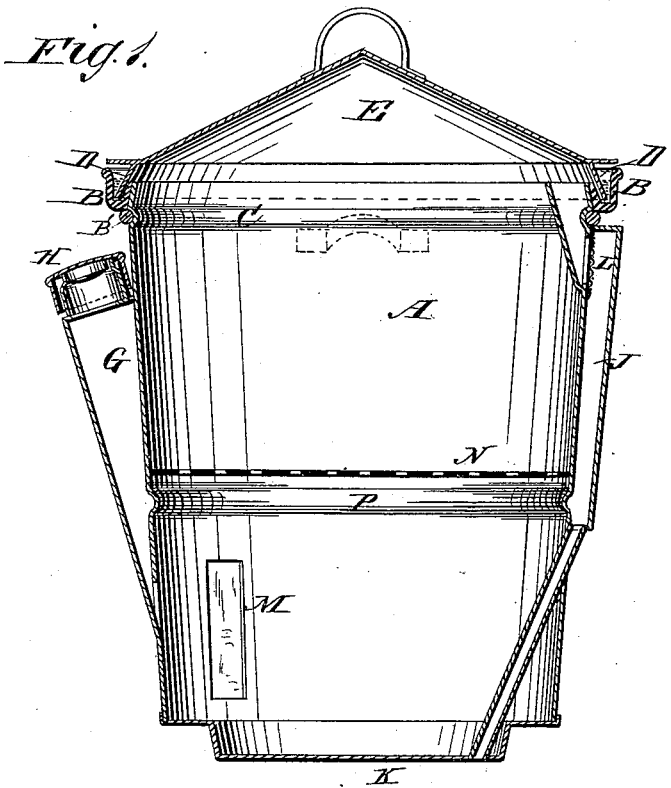
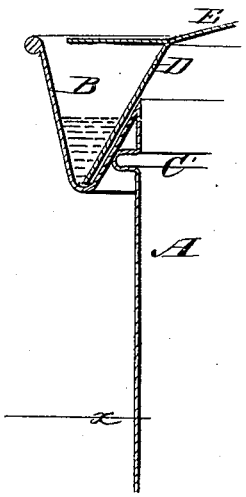
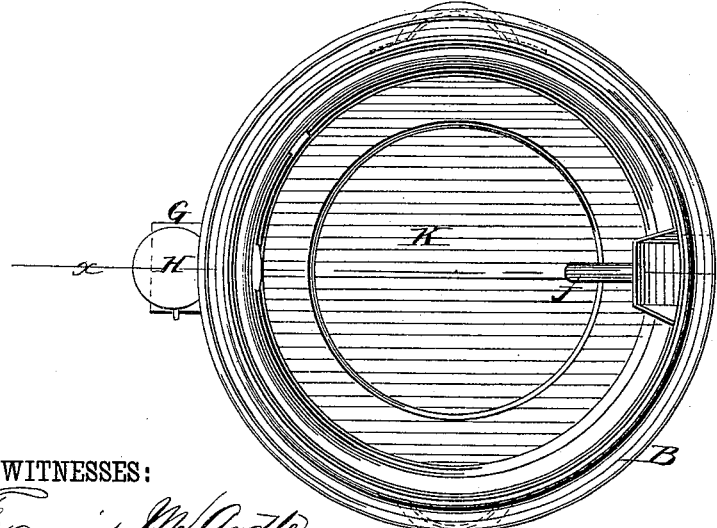
WITNESSES:
Francis McArdle
C. Sedgwick
INVENTOR:
T. F. Dean
BY Munn & Co.
ATTORNEYS.

UNITED STATES PATENT OFFICE.

THOMAS F. DEAN, OF BOSTON, MASSACHUSETTS.

STEAM-COOKER.

SPECIFICATION forming part of Letters Patent No. 246,472, dated August 30, 1881.

Application filed December 27, 1880. (Model.)

*To all whom it may concern:*

Be it known that I, THOMAS F. DEAN, of Boston, in the county of Suffolk and State of Massachusetts, have invented a new and Improved Steam-Cooker, of which the following is a full, clear, and exact description.

The object of my invention is to provide the convenient supply of water to the cooker and prevent the escape of odors therefrom.

The invention consists in a suitable vessel of cylindrical or other form, provided near its mouth with a V-shaped water-ring, one edge of which is united with the upper edge of the vessel, the bottom of this V-shaped ring resting upon a bead projecting from the vessel. This vessel is provided with a conical cover, a sieve, or perforated disk for receiving the articles to be cooked, with a water-filling tube, with an exhaust-tube for carrying off the odor of the articles being cooked, and with a small pane of glass or mica, that is inserted in the side of the boiler to show the condition of the contents or height of the water in the same.

In the accompanying drawings, Figure 1 is a vertical central section of my improved steam-cooker on the line $x\ x$, Fig. 2. Fig. 2 is a plan view of the same, showing the cover and the sieve removed. Fig. 3 represents a detail view of a modification of the device embodied in Fig. 1.

Similar letters of reference indicate corresponding parts.

The cylindrical or like vessel A has the upper inner edge of a V-shaped cast-iron ring, B, attached to its upper edge, and the bottom of this V-shaped ring B rests against a ring, B', in a concavity of the inner bead, C, or against an outer bead, C', projecting outward from the body of the vessel A. This V-shaped ring B is to contain water, and the outwardly-inclined edge ring D of the cover or lid E is to pass into the water of this ring, so that no vapors or odors can pass out through the joint of the cover and the vessel, and as this water shall not boil and evaporate, the ring is arranged not to be in contact with the vessel A, as it would otherwise become heated. So that the pressure of the steam in the cooker cannot force the water out of the V-shaped ring, the edge ring D of the cover is so inclined that it fits closely upon and is parallel with the upper surface of the inner side of the V-shaped ring B, and the straight flange or lip covers the V-shaped ring.

A filling-tube, G, provided with a cap, H, is fastened to the outer side of the vessel A, and permits of filling the vessel without raising the cover E.

A tube, J, is attached to the side of the vessel A, and passes through the same to the bottom K of the vessel, and as the upper end of this tube J is in communication with the interior of the vessel, all odors and vapors must pass through this tube, as this is the only outlet, and as these vapors or gases pass over the flames under the bottom K of the vessel they are consumed. The upper aperture of the tube J is closed by wire-netting L, for the purpose of controlling the steam in the cooker. The principle upon which it works is that the higher the pressure the more steam will escape, and as it requires pressure to drive it through the gauze there will be little escape at low pressure, as there is no pressure to force the steam out.

A pane, M, of glass or mica is fastened in the side of the vessel A, near the bottom, to indicate the height of the water in the vessel A. A sieve or perforated plate, N, for receiving the articles to be cooked, rests upon a bead, P, on the inner side of the vessel A.

If desired, a cylinder containing a sieve or perforated plate may be placed on the vessel A, the upper edge of this cylinder being also provided with a cast-iron V-shaped ring, whereas the lower edge of this vessel rests in the V-shaped ring of the vessel A. The cast-iron ring B strengthens and stiffens the upper edge of the vessel in a perfect manner.

Having thus fully described my invention, I claim as new and desire to secure by Letters Patent—

1. In a cooker, the cover provided with an edge ring, D, inclined to fit closely upon and parallel with the upper surface of the inner side of the V-shaped ring B, and covering said ring B with a lip, as shown and described.

2. In a steam-cooker, the V-shaped water-ring B, attached to the upper edge of the vessel A, and resting on a bead, C, of the cooker A, substantially as herein shown and described, and for the purpose set forth.

THOMAS FRANCIS DEAN.

Witnesses:
JOSEPH MCDONALD,
JAMES P. DEAN.